United States Patent [19]

Waldman

[11] Patent Number: 4,540,984
[45] Date of Patent: Sep. 10, 1985

[54] ENERGY SAVING CONTROL CIRCUIT FOR A LIGHT SWITCH AND A METHOD THEREFOR

[76] Inventor: Herbert H. Waldman, 1739 52nd St., Brooklyn, N.Y. 11204

[21] Appl. No.: 439,650

[22] Filed: Nov. 5, 1982

[51] Int. Cl.³ .................. H04Q 1/00; H01H 43/04
[52] U.S. Cl. .................. 340/825; 307/141; 307/132 E; 340/309.15; 367/198
[58] Field of Search .......... 340/825, 826.22, 309.15, 340/825.62, 825.57; 367/198; 307/139–141, 592–595, 132 E; 315/160

[56] References Cited

U.S. PATENT DOCUMENTS

| | | | |
|---|---|---|---|
| 3,898,383 | 8/1975 | Herbits | 367/198 |
| 4,204,149 | 5/1980 | Cleary et al. | 315/360 |
| 4,344,000 | 8/1982 | Schornack et al. | 340/309.15 |
| 4,349,748 | 9/1982 | Goldstein et al. | 315/360 |
| 4,360,739 | 11/1982 | Goldstein | 307/132 E |
| 4,361,767 | 11/1982 | Pelka et al. | 315/360 |
| 4,422,018 | 12/1983 | Bailey | 315/360 |

*Primary Examiner*—Donald J. Yusko
*Attorney, Agent, or Firm*—Ostrolenk, Faber, Gerb & Soffen

[57] ABSTRACT

An energy saving light switch is disclosed. The light switch includes a human actuable switch and a control circuit responsive thereto. The control circuit operates a light in a first timed mode in which the light is turned on for a predetermined period of time responsive to an initial actuation of the switch and operates the light in a second untimed mode in which the light is turned on for an indefinite period of time responsive to the actuation of the switch during a predetermined time window forming part of the predetermined time period.

90 Claims, 12 Drawing Figures

ENERGY SAVING CONTROL CIRCUIT FOR A LIGHT SWITCH AND A METHOD THEREFOR

BACKGROUND OF THE INVENTION

The present invention is directed to lighting control systems and more particularly to a system for controlling electric lights in such a manner as to minimize energy consumption.

In view both of the worsening energy shortage and of the consequent rise in energy costs, it is becoming ever more important to eliminate energy waste. One of the most common types of energy waste results from the widespread practice of neglecting to turn off electric lights when they are not needed. In particular, many people habitually enter a room, turn on a light, and then leave the room without turning the light off. It is not uncommon for a large percentage of the lights in a house or apartment, for example, to be on at one time, even if only one room is occupied and the other rooms are vacant. This problem is not limited to residential buildings, but is also frequent in commercial, industrial, health-related and other facilities.

SUMMARY OF THE INVENTION

It is the primary object of the present invention to provide a simple and economical apparatus for controlling electrical lighting in such a way as to limit the waste of electricity.

It is another object of the invention to provide such an apparatus that will nonetheless allow flexibility in its use and will not inconvenience the user.

It is still another object of the invention to provide such an apparatus that will automatically turn off lights after they have been on a preset time period, and that will give the user a warning a short time before the lights are to go out.

It is still another object of the invention to provide such an apparatus that will also allow the user to turn the lights on and keep them on indefinitely without having to reactuate them periodically.

It is yet another object of the invention to provide such an apparatus that will permit the user to actuate the lights for an indefinite period only by following a special prescribed procedure.

It is still a further object of the invention to provide such an apparatus that will nonetheless permit the user to turn the lights out instantly at any time desired.

These and other objects are achieved according to the present invention by providing an energy saving light switch comprising:

(a) a human actuable switch;
(b) a control circuit responsive to the actuation of said human actuable switch for selectively operating said light in a first timed mode in which said light is turned on for a predetermined period and a second untimed mode in which said light is turned on for an indefinite time period, said control circuit:
  (1) operating said light in said first timed mode responsive to an initial actuation of said human actuable switch; and
  (2) operating said light in said second untimed mode responsive to an actuation of said human actuable switch during a predetermined time window forming part of said predetermined time.

In an alternative embodiment, first and second switches are provided for turning on an electric light for first and second predetermined periods, respectively. At the end of the predetermined period for which the light has been actuated, the apparatus turns the light off automatically. One period is preferably much longer than the other, the first period being, for example, one hour and the second period being, for example, ten minutes. If one expects to be in the room for only a few minutes, one actuates the second switch, while if one expects to be there longer, one actuates the first switch. In the latter case, if one realizes after, for example, 35 minutes that one will not require the entire hour but only a few more minutes, one can then actuate the second switch, which action cancels the previous command for an hour of illumination and causes the light to remain on for only ten more minutes after the actuation of the second switch. Conversely, if one has initially actuated the second switch and then realizes that one will need to remain in the room a substantially longer time, one actuates the first switch, overriding the original command and causing the light to remain on for a full hour after the actuation of the first switch. In the preferred embodiment, a third switch, which is a master off switch, is provided to permit instant deactivation of the light at any time.

If the light is initially actuated for a period of one hour, and at the end of the hour it becomes clear that one will require illumination for a substantially longer time, one has two choices according to the preferred embodiment. At the end of the hour one can simply reactuate the first switch in the usual manner to obtain an additional hour of light. Alternatively, one can actuate the first switch in a special prescribed manner and the light will remain on indefinitely. In a preferred embodiment the first and second switches are the two sides of a momentary rocker on-off switch, and the special prescribed mode of actuation for initiating the untimed mode, in which the light will remain on indefinitely, may require depressing the first switch twice in quick succession, or depressing and holding down for a predetermined length of time, e.g. five seconds.

In one preferred embodiment, the untimed mode can be initiated only during a special interval of time, or "window", of, for example, ten minutes at the end of the hour following the actuation of the first switch. In this embodiment, an alarm is provided to alert the user that the hour is nearly over and that a decision must be made whether to allow the light to turn off at the end of the hour whether to extend the time period for a second hour, whether to extend it only for a few additional minutes by actuating the second switch, or whether to initiate the untimed mode. The alarm may be a buzzer or an electronically generated tone, or may be a flashing light. In one especially preferred embodiment, the alert signal takes the form of a dimming of the illumination provided by the light controlled by the switch of the invention. In another preferred embodiment, however, the untimed mode can be initiated at any time by following the prescribed procedure (two taps of the switch in quick succession, holding the switch down for five seconds, etc.).

In various other embodiments of the invention, the untimed mode may be initiated by other means, for example, by means of a special control key used to mechanically actuate an additional switch to initiate the untimed mode and disable the timing mechanisms used to control the switch in the timed modes. Alternatively, the untimed mode may be initiated by means of a special radio signal or a special voice signal.

In the most preferred embodiment, a second alert signal is given a predetermined time, e.g. three hours, after the initiation of the untimed mode. This alerts the user, who may have gone into another room without turning off the lights, that the lights are still on. In addition, even in the untimed mode, the lights may be turned off automatically a predetermined length of time after the generation of the second alert signal.

It is preferred to implement the present invention using integrated circuitry, but it can also be implemented using discrete circuitry or mechanical control means. It can also be carried out by means of a microprocessor.

Other objects and features of the invention will be apparent from the following description and the accompanying drawings.

BRIEF DESCRIPTION OF THE FIGURES

For the purpose of illustrating the invention, there are shown in the drawings several embodiments which are presently preferred, it being understood, however, that the invention is not limited to the precise arrangements and instrumentalities shown.

DETAILED DESCRIPTION OF THE PREFERRED EMBODIMENTS

Figure 1:
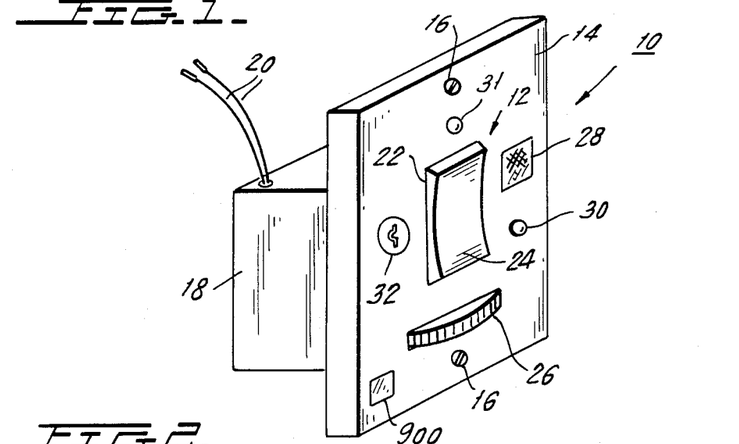
FIG. 1 is a perspective view of one preferred embodiment of the energy-saving light switch of the invention.

Referring now to the drawings wherein like numerals indicate like elements, FIG. 1 shows a control switch constructed in accordance with one preferred embodiment of the present invention and designated generally as 10. Control switch 10 includes a momentary rocker on-off switch 12 provided in a wall plate 14 which is adapted to be mounted on a wall by means of screws 16 in the manner of a conventional light switch. The mechanical or electronic components by means of which the invention is carried out are contained in a housing 18 disposed on the back surface of the wall plate 14. Two wires 20 are provided for connection to the a.c. power line. Two additional wires, which are not visible in the view of FIG. 1, are connected to the wall wiring leading to the light or lights to be controlled by the switch of the invention. When the rocker switch 12 is actuated by the depression of the upper part 22 thereof, the light controlled by the switch of the invention is turned on in a first timed mode, in which the light will remain on for a relatively long time, e.g. one hour, and will then automatically be turned off unless the switch is reactivated before then to extend the period of illumination for a second hour. Actuation of the rocker switch 12 by depression of its lower part 24 actuates the light in a second timed mode for a relatively short time, e.g. ten minutes, at the end of which the light is automatically turned off unless the switch is reactuated before then. In the preferred embodiment shown, a thumb wheel 26 is provided to permit the adjustment of the length of time the light remains on in the first timed mode.

Shortly before the end of the hour for which the light is lit in the first timed mode, an alert signal is produced to alert anyone in the room that only a short time, e.g. five minutes or ten minutes, remains before the light will be automatically extinguished. The alert signal may be a tone produced by a buzzer or an electronic tone generator via a speaker 28 provided in the face of the wall plate 14. Alternatively, the alert signal may be generated by causing the light being controlled (light 38) to blink on and off. In one preferred embodiment, the upper part 22 of the rocker switch 12 can be reactuated at any time to cause the light to remain illuminated for an hour after such reactuation. In this way, once the alert signal has sounded, or at any other time, one can reactuate the upper part 22 of the switch 12 to obtain an additional hour of illumination. Similarly, the lower part 24 of switch 12 can be actuated at any time. If this is done, the light will remain lit for ten minutes after such actuation, even if the upper part 22 of the switch 12 has been actuated in the preceding hour. If the light switch of the invention is installed in a room adjacent a hallway or other room that is poorly illuminated, then when one is ready to leave the well-lit room having the light switch of the invention and to pass through the unlit corridor, one can actuate the lower part 24 of the switch 12, causing the light to remain on a sufficient length of time to permit one to leave the room and pass through the corridor with the aid of the light. The light will then automatically be turned off ten minutes later. The preferred embodiment shown also has a master off switch 30 by means of which the light can be turned off instantly at any time.

There will inevitably be occasions when a user must remain for several hours in a room provided with the light switch 10 of the invention. In such a case, it is desirable not to have to reactuate the light periodically, and it is also desirable not to be interrupted every hour by the alert signal. The switch 10 of the invention is, therefore, provided with an untimed mode of operation, in which the light controlled by the switch 10 remains on indefinitely, as with conventional switches. It would, of course, be possible simly to provide a second rocker switch to perform like a conventional light switch while the other rocker switch is used to turn the light on in either of the two timed modes. If this were done, however, the temptation would be great always to use the conventional switch. Therefore, although an embodiment having an additional switch to initiate the untimed mode falls within the scope of the invention, it is greatly preferred instead that the untimed mode should be initiated only by means of actuating rocker switch 12 in a special prescribed manner, such as actuating the upper part 22 of the switch 12 twice in quick succession, or depressing the upper part 22 and holding it down for a certain minimum time interval such as five seconds.

This arrangement, however, is also liable to abuse, since a person who habitually fails to turn the light off when leaving the room can easily adapt to the necessity of tapping the light switch twice rather than once, or holding it down for at least five seconds, thus subverting the purpose of the invention. To prevent this, it is preferred that operating switch 12 in the special prescribed fashion will initiate the untimed mode only when the switch 10 is previously put in the first timed mode and the light has then been allowed to burn for a set amount of time, e.g. 55 minutes, without the switch 10 of the invention having been reactuated or turned off in the meantime. In this embodiment, the user actuates the switch 10 in the long (first) timed mode by depressing the upper part 22 of the rocker switch 12. After 55 minutes have elapsed, the switch 10 produces the alert signal to indicate the approaching end of the one hour of illumination provided by the long timed mode. Simultaneously with the generation of the alert signal, a five-minute "window" begins during which the user can initiate the untimed mode by actuating the rocker switch 12 in the special prescribed fashion. The untimed mode cannot be initiated until the lights have been on 55 minutes in the first timed mode. Thus, with this embodiment, it is impossible to waste more than an hour's worth of electricity at once without following the prescribed pattern.

The likelihood of waste can be further reduced by means of another variation of the embodiment described above. In the embodiment described thus far, each normal actuation of the rocker switch 12 cancels previous commands, so that if a person actuates the upper part 22 of the switch 12 and then several minutes later actuates upper part 22 a second time, the second actuation resets the timing mechanism of the switch 10 so that the light will stay on for an hour from the second actuation. If the switch 12 is thoughtlessly touched by someone after the light has already been turned on, it is possible that the light will unnecessarily remain on for an hour from the last actuation of switch 12 rather than from the first actuation thereof. To prevent this possibility, it may be desirable to disable the upper part 22 of the rocker switch 12 from the time it is first actuated until the generation of the alarm signal 55 minutes later. With this feature, the one hour timed mode cannot be accidentally reinitiated during the 55 minute time interval. If, however, the user wishes to reinitiate a one hour timed interval, he may do so after the alarm signal is given. The light can also be turned off instantly at any time by means of the master off switch 30, and the short timed mode can be initiated at any time by depressing the lower part 24 of switch 12, even if the upper part 22 of the switch 12 has previously been actuated.

Instead of or in addition to permitting the untimed mode to be initiated only during a brief "window" after the light has been operated in the long timed mode for almost a full hour, a lock 32 can be provided that must be turned by means of a special control key in order to permit initiation of the untimed mode. The lock 32 can, for example, comprise a key-operated switch that connects and disconnects circuitry by means of which the untimed mode is initiated, as will be described below.

In the preferred embodiment, a light emitting diode (LED) 34 is provided to indicate whether the switch 10 is operating in a timed mode or in the untimed mode. It is preferred that the LED 34 is lit when the switch is operating in a timed mode, but the reverse arrangement is also contemplated. In the latter case, it is especially advantageous for the LED 34 to flash, so as to attract the attention of anyone in the room who passes the switch 10.

In another preferred embodiment, the third mode of operation, referred to above as "the untimed mode", may be replaced with what is really a third timed mode, initiated in any of the same ways as those described above for the untimed mode. In the third timed mode, an alert signal is generated after a relatively long period of time, such as three hours, and if the switch 10 is not reactuated within a short time (for example, ten minutes) of the alert signal being given, the light is automatically turned off.

Figure 2:
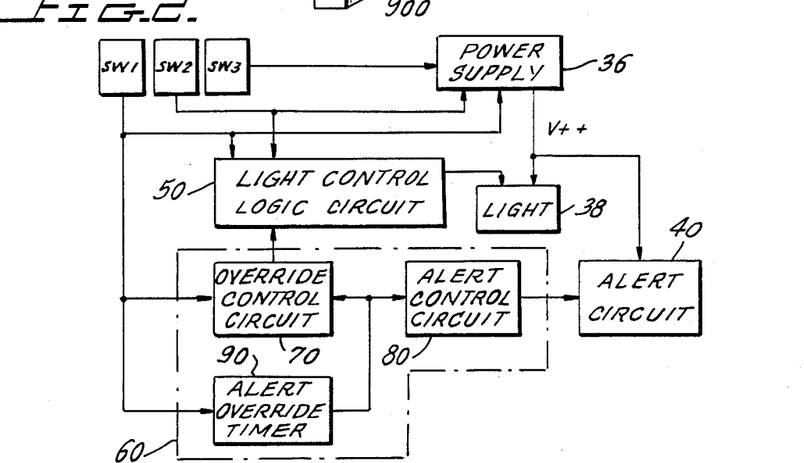
FIG. 2 is a block circuit diagram showing schematically the embodiment of FIG. 1.

As stated above, the present invention can be carried out by mechanical means or by electronic means, including a microprocessor. It is preferred, however, to use electronic circuitry. FIG. 2 is a block diagram showing one possible electric circuit used to carry out the invention. In this embodiment, switches Sw1, Sw2 and Sw3 correspond respectively to the upper part 22 of rocker switch 12, the lower part 24 of switch 12 and the master off switch 30, respectively. A power supply circuit 36 converts a.c. line voltage into a d.c. supply voltage V+ (see FIGS. 3, 4 and 7) to provide power and necessary biasing to the electronic circuitry. The power supply circuit 36 also generates a relatively high voltage V++ to power the light 38 and the alert circuit 40. High voltage V++ may be a relatively high d.c. voltage (e.g., 120 volts) or may be simply the a.c. line voltage. In the embodiment employing an electronic tone generator as the alert circuit 40, a relatively low d.c. voltage V+ is supplied to it instead of high voltage V++.

Light control logic circuit 50 is actuatable by switches Sw1 and Sw2 and controls the operation of the light(s) 38 in the first and second timed modes. Override and alert signal control logic 60 turns the alert circuit 40 on and off at the proper times and also initiates the third timed mode or the untimed mode, depending upon the embodiment, disabling the light control logic circuit 50 to prevent the latter from turning the light 38 off. Logic 60 includes an override control circuit 70, an alert control circuit 80 and a timer circuit 90. Override control circuit 70 is used to initiate the third timed mode or the untimed mode, depending upon the embodiment, by disabling the light control logic circuit 50 in such a way as to prevent the latter from extinguishing the light 38. Alert control circuit 80 is provided to turn the alert circuit 40 on and off at the proper time. Alert ad override timer circuit 90 enables the override control circuit 70 and the alert control circuit 80 a predetermined length of time, e.g. five minutes, before the end of the one hour of illumination provided in the first (long) timed mode. The circuitry of FIG. 2 will now be explained in greater detail with reference to FIGS. 3–8.

Figure 3:
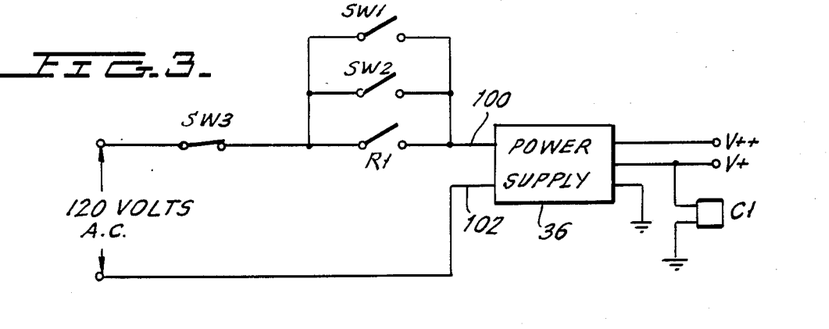
FIG. 3 is a circuit diagram in conjunction with which the manner in which the power supply of the switch of the invention is connected to and disconnected from line voltage will be explained.

As can be seen from FIG. 3, a.c. line voltage is provided to the power supply 36 via lines 100 and 102. Switches Sw1 and Sw2 are connected in parallel with each other in line 100. A relay R1 is connected in parallel with switches Sw1 and Sw2. Master off switch Sw3 is provided in either line 100 or line 102. As shown, the normal position of switches Sw1 and Sw2 and of relay R1 is open, while the normal position of switch Sw3 is closed. Relay R1 is controlled by coil C1, to which power is supplied by power supply circuit 36. Although as electromagnetic relay R1 is shown, a solid state relay could be used instead. While in the open position shown, switches Sw1 and Sw2 and relay R1 prevent the application of line voltage to the power supply circuit 36, so that no power is being consumed. When either switch Sw1 or Sw2 is actuated, line voltage is applied to the power supply circuit 36 and, via power supply output V++, to the light 38. A current is also caused to pass through coil C1, holding relay R1 closed. When master off switch Sw3 is actuated, line current ceases momentarily to be applied to the power supply 36, and the current through coil C1 falls to zero, allowing relay R1 to open and thus breaking the circuit until such time as switch Sw1 or Sw2 is again actuated. Otherwise, the light 38 is turned off automatically by the light control logic circuit 50 reducing the current through coil C1 to zero in a manner that is described below.

Figure 4:
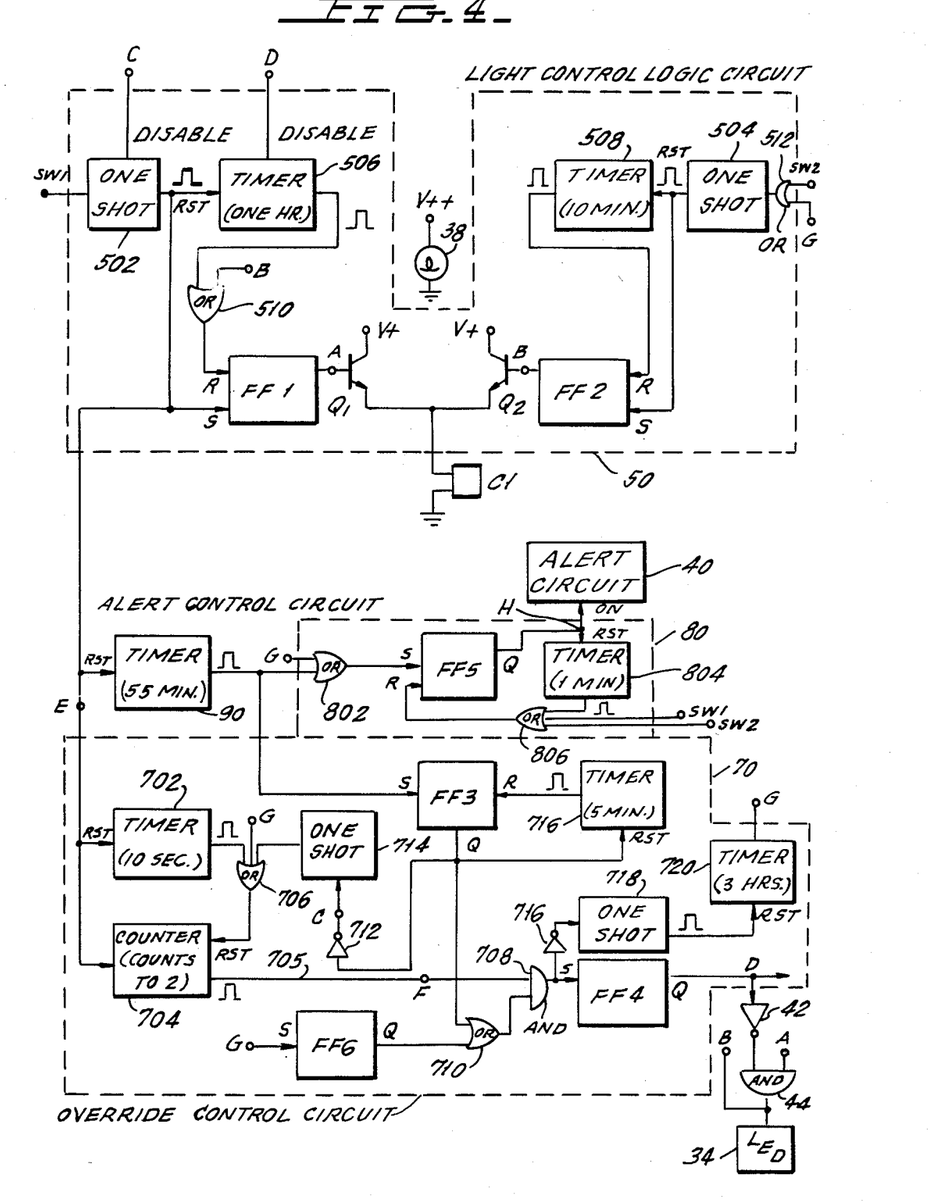
FIG. 4 is a more detailed circuit diagram of the embodiment of FIG. 1.

FIG. 4 shows in detail the circuitry of one preferred embodiment of the invention. As shown therein, light control logic circuit 50 comprises two parts, one of which causes the light 38 to remain illuminated for one hour after actuation of switch Sw1 (first timed mode), while the other part causes the light to remain illuminated for ten minutes after actuation of switch Sw2 (second timed mode). Each of these two parts of the light control logic circuit 50 comprises a respective one shot 502, 504 which each emit a single pulse upon actuation of switch Sw1 or switch Sw2, respectively. The respective outputs of one shots 502 and 504 are applied to the reset input of a respective timer 506, 508, as well as to the set inputs of a respective flip-flop FF1, FF2. The output of timer 506 is applied to one input of an OR gate 510, whose output is applied to the reset input R of flip-flop FF1. The output of timer 508 is applied directly to the reset input R of flip-flop FF2. The outputs A, B of flip-flops FF1 and FF2 are each applied to the base of a respective transistor Q1, Q2. The transistors Q1 and Q2 are connected in parallel with each other between voltage source V+ and coil C1, the low voltage side of which is grounded. High voltage output V++ of the power supply circuit 36 is connected to light 38 in such a manner as to cause current to pass therethrough when relay R1 is closed (i.e. when either transistor Q1 or transistor Q2 is in the conducting state). In addition, the output B of flip-flop FF2 is also applied to a second input of OR gate 510.

Although the following description assumes the use of positive logic, the invention could equally well be practiced with negative logic, as is well known to those skilled in the art.

When switch Sw1 is actuated to initiate the first (long) timed mode, a high voltage, or logic 1, is applied to the input of one shot 502 as long as switch Sw1 is held depressed by the user's finger. During this short interval, power supply circuit 36 applies a reset pulse to all flip-flop circuits in the switch 10 of the invention to reset them, in a known manner. When the switch Sw1 is released, the voltage applied to one shot 502 falls to a logic 0 value, and the one shot 502 generates a single pulse of a predetermined length, which is applied to the reset input RST of timer 506 and also to the set inputs of flip-flop FF1, causing the output of flip-flop FF1 to assume a logic 1 state. The logic 1 appearing at the output of flip-flop FF1 is applied to the base of transistor Q1, maintaining the latter in the conductive state and allowing current to flow through coil C1 of relay R1, which is thus held closed. The output of timer 506, which in the preferred embodiment has a period of one hour, remains at the logic 0 state for one hour at the end of which it generates a single pulse which resets flip-flop FF1 and returns the output of the latter to the logic 0 state. When the output of flip-flop FF1 goes low, the transistor Q1 is rendered non-conductive. This reduces the current through coil C1 to zero, allowing relay R1 to open and thereby disconnecting the power supply circuit 36 from the line voltage and extinguishing the light 38.

The operation of the light control logic circuit 50 after the actuation of switch Sw2 to turn on the light 38 is identical, except that timer 508 times out after only ten minutes in the preferred embodiment rather than one hour, and therefore will not be described in detail.

If switch Sw1 is actuated and less than an hour later (which the light 38 is still on) switch Sw2 is actuated, circuit 50 operates in the following manner. Due to actuation of switch Sw1, the output of flip-flop FF1 is at the logic 1 level and transistor Q1 is conductive. The actuation of switch Sw2 causes one shot 504 to generate a single pulse, which resets ten minute timer 508 and sets flip-flop FF2, so that the output of the latter switches to logic 1 state. This renders transistor Q2 conductive, and also resets flip-flop FF1 via OR gate 510, causing the output of flip-flop FF1 to switch to the logic 0 level. The light 38 remains lit until timer 508 times out, ten minutes after actuation of switch 2. Flip-flop FF2 is then reset by the timing out of timer 508 and its output switches to the logic 0 level, turning transistor Q2 off and allowing relay R1 to open. As a result of this arrangement, when it is desired to leave the room with the light on to permit one to see one's way better, one actuates switch Sw2 on the way out. The light 38 remains on until after one has left the room but is turned off automatically ten minutes later, so that little electricity is wasted.

The output of one shot 502 is also applied to reset timer 90 and to the input of override control circuit 70. Timer 90 has a period somewhat less than that of timer 506. In the preferred embodiment shown, the period of timer 90 is fifty-five minutes. Its purpose is to control the actuation of alert circuit 40 to alert the user that the light 38 will shortly be extinguished, and also to cooperate with override control circuit 70 to permit initiation of the untimed mode, as described below.

When timer 90 times out fifty-five minutes after actuation of switch Sw1, it produces a pulse which is applied via OR gate 802 to the S input of flip-flop FF5, causing the output Q of the latter to switch to the logic 1 level. The output H of flip-flop FF5 is applied to alert circuit 40, causing the latter to generate an alert signal. In the preferred embodiment, the alert signal may be an audio signal produced by a buzzer or an electronic tone generator, or it may be a flashing light or LED or the like. Alternatively, as is explained in more detail below, the alert signal may take the form of a dimming of the light 38.

When the output Q of flip-flop FF5 goes high, it resets a timer 804. The period of timer 804 is quite short, for example thirty seconds or one minute. When timer 804 times out, it generates a pulse which is applied via OR gate 806 to the reset input R of flip-flop FF5, causing the output of the latter to switch to the logic 0 level terminating the alert signal. If someone is in the room at the time the alert signal goes off and in response to it actuates switch Sw1 to obtain an additional hour of illumination or actuates switch Sw2 to obtain an additional 10 minutes of light, the actuation of either of these switches causes a logic 1 level signal to be applied via OR gate 806 to the reset input R of flip-flop FF5 to turn the alert signal off even if timer 804 has not yet timed out.

As explained above, if a person in the room intends to remain there for a considerable length of time, it may be desirable to have the light 38 remain on for an indefinite period, of at least a very long period of time, without having to reactuate switch Sw1 each hour or to be distracted by the alert circuit 40. Override control circuit 70 permits this to be done, by generating a signal which disables timer 506 responsive to the actuation of switch Sw1 according to a special prescribed pattern. In order for the override control circuit 70 to disable timer 506, however, switch Sw1 must be actuated according to the special pattern during the five-minute period beginning with the generation of the alarm signal by alert circuit 40. In the preferred embodiment, the untimed mode cannot be initiated at any other time.

In the embodiment illustrated in FIG. 4, the output of one shot 502 is input both to the reset input of timer 702 and to the input of binary counter 704. Timer 702 has a relatively short period, such as ten seconds. Upon timing out, the timer 702 generates a pulse which is applied via OR gate 706 to the reset input RST of counter 704. Each time switch Sw1 is actuated, binary counter 704 receives a pulse from one shot 502. When the count in counter 704 reaches two, counter 704 generates a single pulse on its output 705. Since, however, timer 702 resets counter 704 to zero every ten seconds, counter 704 generates a pulse on its output 705 only if switch Sw1 is actuated twice within a ten-second period. This pulse will place switch 10 in the untimed mode only if it is generated during the five minute window appearing at the end of the one hour time period set by timer 506.

In order to ensure that switch 10 can be placed in the untimed mode only during this five minute window, disable circuit 70 includes an AND gate 708 which is normally disabled at all times except during this window. As such, any pulse generated on line 705 will be applied to flip-flop FF4 only during the time interval defined by the five minute window. The operation of AND gate 708 is controlled primarily by flip-flop FF3. When timer 90 generates a pulse fifty-five minutes after the initial actuation of switch Sw1, it generates a pulse that is applied to the set input S of the flip-flop FF3, raising the output of the latter to the logic 1 level. The Q output of flip-flop FF3 is applied, via OR gate 710 to one input of AND gate 708. The output Q of flip-flop FF3 is also inverted by inverter 712, and applied to both one shot 714 and to the disable input of one shot 502. The output of the one shot 714 is applied to a second input of OR gate 706, whose output is applied to the reset input of counter 704. Thus, when the Q output of flip-flop FF3 goes high, the output of inverter 712 goes low, actuating one shot 714 to generate a pulse which resets counter 704 to zero. If the switch Sw1 is now actuated twice within a period of ten seconds, counter 704 will generate a pulse which is applied to a second input of AND gate 708. Since the logic 1 level output of flip-flop FF3 is applied to the other input of AND gate 708, the output of the AND gate now switches to the logic 1 level and is applied to the set input S of flip-flop FF4, whose output D is accordingly caused to switch to the logic 1 level. This signal is applied to the DISABLE input of timer 506 of the light control logic circuit 50, preventing the timer 506 from generating a pulse at the end of the hour. Since timer 506 does not generate a pulse, flip-flop FF1 is not reset at the end of the hour following the initial actuation of switch Sw1, and the light 38 remains on.

The output of flip-flop FF4 is also applied to inverter 42, whose output is applied to one input of AND gate 44. The other input of AND gate 44 receives the output A of flip-flop FF1. The output of AND gate 44 is therefore at the binary 1 level only when the switch 10 of the invention is operating in the first (long) timed mode, i.e. when flip-flop FF1 is generating a binary 1 output and flip-flop FF4 is generating a binary 0 output. The output of AND gate 44 enables LED 34. The output B of flip-flop FF2 is also connected to LED 34 to enable the latter. The LED 34 will therefore be lit if the switch 10 is operating in either the first (long) or the second (short) timed mode. If desired, additional conventional circuitry may be provided so that the LED 34 flashes, rather than remaining constantly lit, when the switch 10 is operating in the first or the second timed mode.

As stated above, the mode initiated by means of the special prescribed procedure may be either an untimed mode, in which the light 38 remains on indefinitely (that is, until it is purposefully turned off by the operator of light 38), or a third timed mode, in which the light 38 is merely left on for a very long time before being automatically turned off. In the preferred embodiment shown in FIG. 4, the latter alternative is adopted. To this end, the output of AND gate 708, which output is high or logic 1 when the third timed mode is actuated, is applied to inverter 716, which actuates one shot 718 to generate a pulse. This pulse is applied to the reset input RST of timer 720, whose period is relatively long, for example, three hours in the embodiment of FIG. 4. The output G of timer 720 is applied to a second input of OR gate 802 in the alert control circuit 80. Three hours after the third timed mode is initiated, therefore, an alert signal is generated by alert circuit 40, alerting anybody who may still be in the room that the light 38 will shortly be turned off. The pulse generated by timer 720 at the end of the three hour interval also actuates one shot 504 via OR gate 512 to raise the output of flip-flop FF2 to the binary 1 level resetting flip-flop FF1. Ten minutes later, if neither of switches Sw1 and Sw2 has been actuated, timer 508 resets flip-flop FF2, rendering transistor Q2 non-conductive and opening relay R1 to turn the light 38 off. In effect, therefore, the signal generated by the alert circuit 40 at the end of the three hour period serves as an extra precautionary monitor alert which determines whether anybody is still in the room. If anyone is still present, they will take appropriate action to ensure that the light 38 remains lit, and otherwise the switch 10 of the invention will be allowed to turn the light 38 out ten minutes later.

If anybody is still in the room at the end of the three-hour period and desires the light 38 to remain on, three options are available. If only a few more minutes of illumination are needed, no action is necessary, since the light 38 will automatically remain of for ten more minutes. If a longer period of illumination is required, switch Sw1 can be actuated in the normal manner to place the switch 10 in the first (long) timed mode. If the user expects to remain in the room a very long time, then switch Sw1 can be actuated in the special prescribed manner to reinitiate the third (very long) timed mode. This is achieved as follows.

The output G of timer 720 is applied to the set input S of flip-flop FF6, whose output is applied to the second input of OR gate 710. In addition, the output of timer 720 is also applied to a third input of OR gate 706 to reset counter 704. When timer 720 times out at the end of the three-hour period, the output of flip-flop FF6 becomes high, and is applied via OR gate 710 to one input of AND gate 708. If switch Sw1 is now actuated twice within a ten-second period, counter 704 generates a pulse which is applied to the second input of AND gate 708, resetting timer 720 to provide another three-hour period of uninterrupted illumination.

Figure 5A:
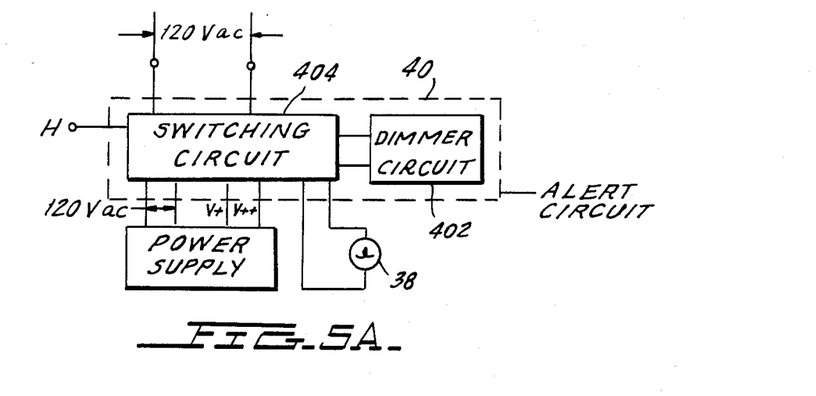
FIGS. 5A and 5B show two preferred embodiments of circuitry used to control the alert signal.

As stated above, the alert circuit 40 may comprise a buzzer or an electronic tone generator, or a flashing red light or the like. Alternatively, the alert circuit 40 may comprise circuitry for temporarily varying (dimming or flashing) the output of light 38, which dimming itself serves to alert anyone in the room that the light will shortly be extinguished. As shown in FIG. 5A, the alert circuit 40 may comprise a conventional dimmer circuit 402 and a switching circuit 404. In this embodiment, the line voltage is supplied to the power supply 36 via switching circuit 404. The power supply also supplies both a relatively low d.c. voltage V+ and a higher voltage V++, which in this embodiment is a d.c. voltage, to the switching circuit 404. Normally, high d.c voltage V++ is applied by the switching circuit 404 to the light 38. When the alert circuit 40 is actuated by the output H of flip-flop FF5, then the switching circuit 404 disconnects the light 38 from high voltage V++ and connects it directly to the line voltage and in series with dimmer circuit 402. The dimmer circuit 402 clips a predetermined amount of the duty cycle of the a.c. line voltage, decreasing the output of the light 38. Preferably, between one-fourth and one-third of the duty cycle is clipped, so that the reduction in the output of light 38 is in the neighborhood of 50%. When flip-flop FF5 is reset, the switching circuit 404 disconnects the light 38 from the dimmer circuit 402 and the line voltage, and reconnects it to d.c. voltage source V++. In an embodiment, where V++ is not a high d.c. voltage but is the line voltage itself, then switching circuit 404 merely serves to switch the dimmer circuit 402 into series with the light 38 on actuation of the alert circuit 40, and to shunt the dimmer circuit 402 when flip-flop FF5 is reset.

Figures 5B, 6:
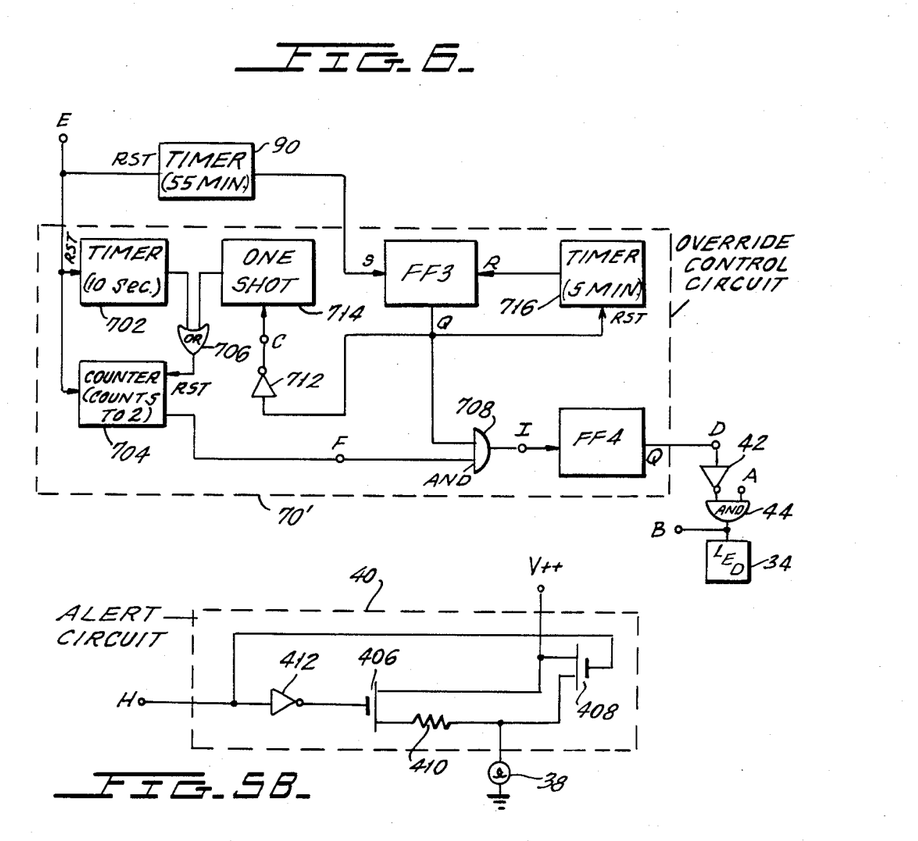
FIG. 6 is a circuit diagram of control circuitry used in another preferred embodiment of the invention to initiate the untimed mode.

In FIG. 5B, another arrangement for dimming light 38 as a signal to the user is shown. In this embodiment, the alert circuit 40 comprises two power transistors 406 and 408, shown as field effect transistors, connected in parallel between the high voltage supply V++ and light 38. A high wattage resistor 410 is connected between the drain of transistor 406 and the junction with light 38 and transistor 408. The output of flip-flop FF5 is applied to the gate terminal of transistor 408 and is also applied, after inversion by inverter 412 to the gate of transistor 406. As long as the output of flip-flop FF5 is low, transistor 408 is in the conductive state while transistor 406 is non-conductive. When the output of flip-flop FF5 goes high, however, transistor 408 becomes non-conductive while transistor 406 becomes conductive, switching resistor 410 into the circuit of light 38. The large voltage drop that now appears across resistor 410 produces a corresponding drop in the output of light 38. When the flip-flop FF5 is reset by timer 804, transistor 406 again becomes non-conductive while transistor 408 returns to the conductive state.

FIG. 6 shows a variation of the override control circuit 70. In this embodiment, the override control circuit comprises the same elements arranged in the same manner as in the embodiment of FIG. 4, except that the override control circuit 70' of FIG. 6 overrides the timer 506 of the light control logic circuit 50 to initiate a real untimed mode rather than merely a third timed mode, as in the embodiment of FIG. 4. The override control circuit 70' of FIG. 6 is therefore like that of FIG. 4, except that it does not include the three-hour timer 720, inverter 716, one shot 718, flip-flop FF6 or OR gate 710. The output of flip-flop FF3 is applied directly to one input of the AND gate 708. The operation of the override control circuit 70' of FIG. 6 is identical to that of the embodiment of FIG. 4, except that once the untimed mode has been initiated by means of the switch Sw1 being depressed twice within a ten-second period, the light 38 remains lit indefinitely.

Figure 6A:
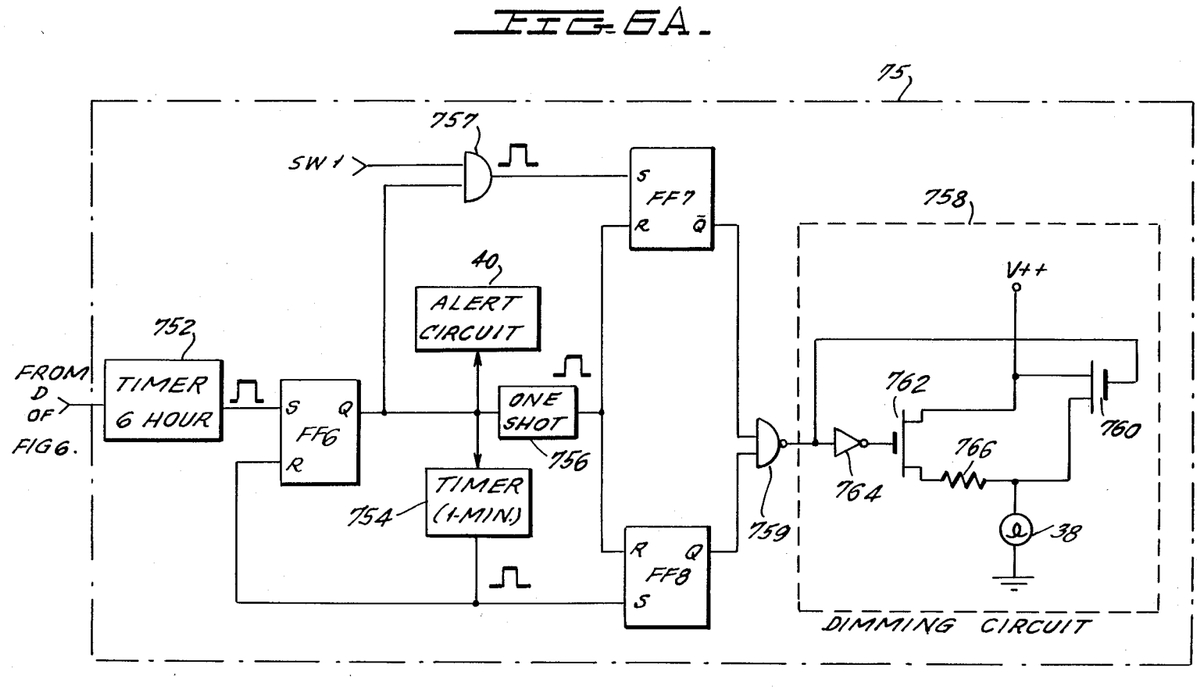
FIG. 6A is a circuit diagram of a dimming control circuit which can be used in connection with the circuit of FIG. 6.

While it is often desirable to turn the light 38 on for an indefinite period in accordance with the control circuit of FIG. 6, an energy saving may be obtained by dimming the light 38 after a predetermined time period, for example, six hours. A circuit for carrying out this function is illustrated in FIG. 6A. In this embodiment, an alert signal is generated at the end of six hours to alert anyone in the room where the light is located that the light will be dimmed in a short while if the switch Sw1 is not reactivated during a predetermined time window, or example, one minute. If no one is in the room, the switch Sw1 will not be reactivated and the light 38 will automatically be dimmed. If someone is in the room and wants the lights to remain at their full intensity, he merely need reactuate switch Sw1 which disables the dimming circuit and maintains the light 38 at full intensity.

In the embodiment of FIG. 6, the output D of flip-flop FF4 goes high whenever the light 38 is placed in the untimed mode. The circuit of FIG. 6 can be modified to dim the light 38 after a predetermined time period by the addition of a dimming control circuit 75 which is illustrated in FIG. 6A. Dimming control circuit 75 includes a timer 752 which is activated by the high output D of flip-flop FF4. At the end of the predetermined time period, e.g. six hours, timer 752 will generate a positive going pulse at its output which is applied to the set input S of flip-flop FF6 causing its Q output to go high. The high appearing at the Q output of flip-flop FF6 is applied to timer 754 and alert circuit 40. Timer 754 defines the time window during which the switch Sw1 can be actuated to prevent the light 38 from being dimmed. In the embodiment illustrated, timer 754 defines a one-minute time window. Any convenient time window may, however, be used. At the end of the time period defined by timer 754, timer 754 generates a positive going pulse at its output which is applied to the reset input R flip-flop FF6 causing the Q output of flip-flop FF6 to go low. As such, the Q output of flip-flop FF6 will remain high for a time period corresponding to the time window defined by timer 754.

The Q output of flip-flop FF6 is applied to alert circuit 40 which may take any of the forms illustrated herein. Alert circuit 40 is activated by the high appearing at the Q output of flip-flop FF6 and informs anyone situated in the room where light 38 is located that the light 38 will be dimmed in a short period of time if the switch Sw1 is not activated.

The Q output of flip-flop FF6 is also connected to one shot 756 which generates a positive going pulse on its output when the Q output of flip-flop FF6 initially goes high responsive to the output of timer 754. This positive going pulse is applied to the reset input R of flip-flops FF7 and FF8 conditioning their outputs in a manner which will ensure that the dimming circuit 758 will lower the intensity of light 38 at the end of the time window defined by timer 754 only if the switch Sw1 is not enabled during that period. Particularly, the pulse appearing at the output of one shot 756 causes the $\overline{Q}$ output of flip-flop FF7 to go high and the Q output of flip-flop FF8 to go low. In this condition, the output of NAND gate 759 will be high thereby enabling transistor 760 and disabling transistor 762 due to the presence of inverter 764. In this connection, the high voltage V++ (which may be either a high d.c. voltage or the line voltage) is applied to light 38. As long as the output of NAND gate 759 remains high, light 38 will remain at its full intensity level. Whenever the output of NAND gate 759 goes low, transistor 760 will be disabled and transistor 762 will be enabled causing the voltage V++ to be applied to light 38 via resistor 766 and thereby reducing the intensity of light 38. As will be shown below, the output of NAND gate 759 will go low at the end of the time window defined by timer 754 only if the switch Sw1 is not activated during the time window.

At the end of the time window defined by timer 754, a positive going pulse is applied to the set input S of flip-flop FF8 causing its Q output to go high. The high at the Q output of flip-flop FF5 will cause the output of NAND gate 756 to go low (and light 38 to be dimmed) unless the flip-flop FF7 has been set during the time window defined by timer 754. Flip-flop FF7 will be set only if the switch Sw1 is activated during this time window so as to cause the output of AND gate 757 to go high. It should be recognized that flip-flop FF7 will not be set by the activation of switch Sw1 during any time interval other than the time window defined by timer 754.

If flip-flop FF7 is not set during the time window defined by timer 754 (i.e. if switch Sw1 is not activated during this time period), the $\overline{Q}$ output of flip-flop FF7 will be at the high level and the output of NAND gate 759 will go low when flip-flop FF8 is set by the output of timer 754. In such a case, light 38 will be dimmed. If flip-flop FF7 is set during this time interval (i.e. if switch Sw1 is activated during this time interval), the $\overline{Q}$ output of flip-flop FF7 will be low and the output of NAND gate 759 will remain high when flip-flop FF8 is set by the output of timer 754. In such a case, light 38 will not be dimmed.

Figure 7:
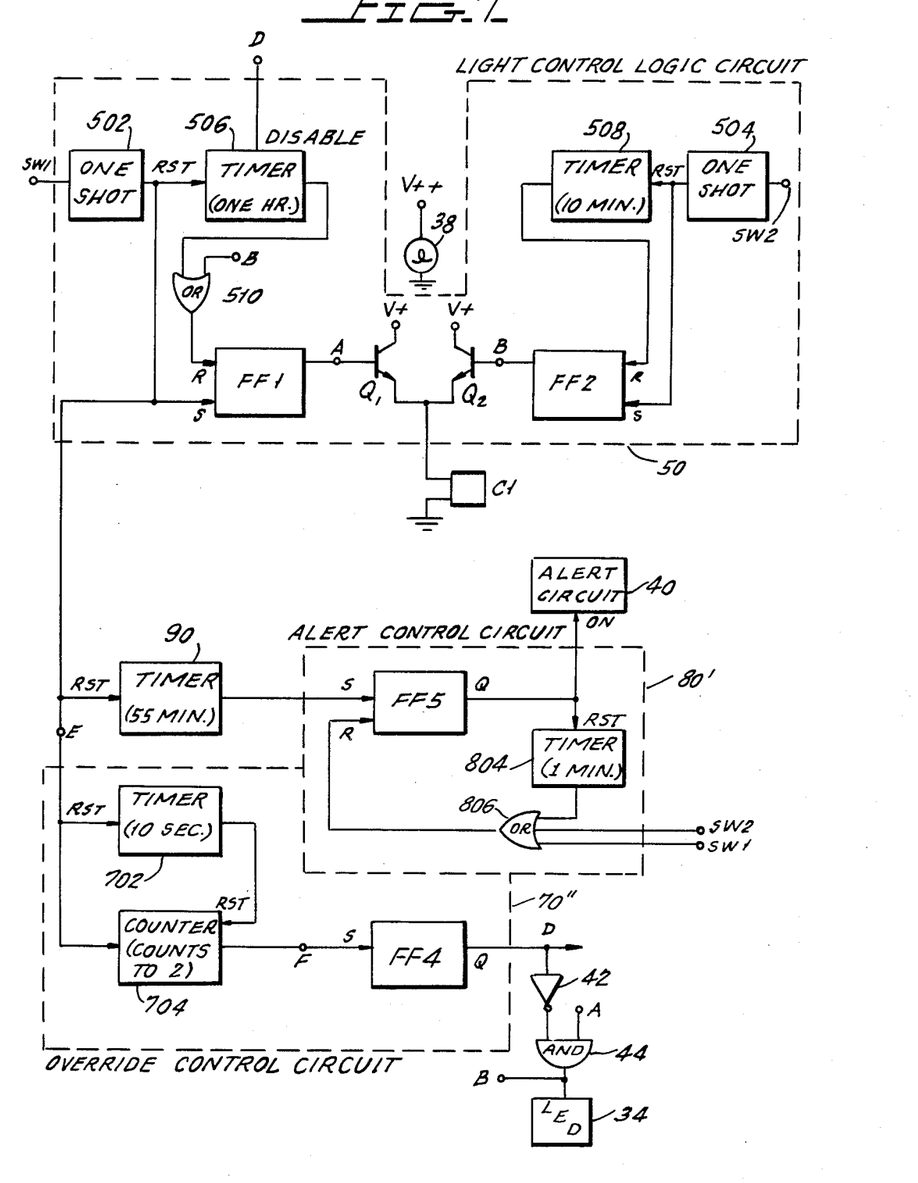
FIG. 7 is a circuit diagram showing another preferred embodiment of the circuitry used to initiate the untimed mode.

FIG. 7 shows another preferred embodiment in which the override control circuit 70" is further simplified, comprising only binary counter 704, ten second timer 702 to reset the counter 704 at intervals of ten seconds, and flip-flop FF4, which generates a signal to disable timer 506 upon receiving a pulse from counter 704. This embodiment differs from that of FIG. 6 in permitting the untimed mode to be initiated at any time, and not only in a five-minute "window" at the end of the hour of illumination provided by the first timed mode. In this embodiment, as also in that of FIG. 6, the absence of timer 720 of the embodiment of FIG. 4 renders OR gate 802 of alert control circuit unnecessary.

Figure 8:
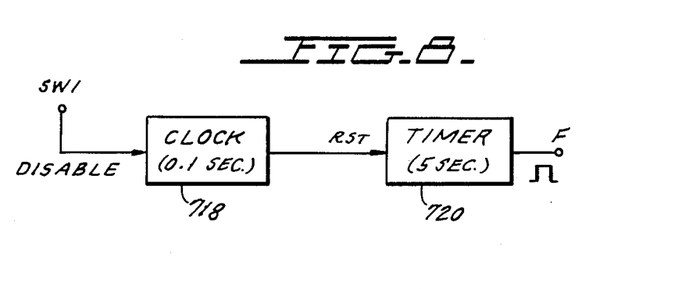
FIG. 8 is a circuit diagram of the circuitry of still another preferred embodiment of the invention.

FIG. 8 shows circuitry that can be substituted for a portion of the override control circuit of any of the embodiments of FIGS. 4, 6 and 7 if it is desired to actuate the third timed mode or the untimed mode by means of holding the switch Sw1 in the depressed position for a minimum period of five seconds, rather than by tapping it twice in succession. This embodiment includes a clock 718 having a very short period (i.e., a high output frequency), for example a tenth of a second, and a timer 720 having a period of five seconds (i.e., the timer times out and generates a single pulse F is not reset for a period of five seconds) and connected to be reset by the output of the clock 718. Switch Sw1 is connected so that when it is depressed, it disables clock 718. The output F of timer 720 is connected to one input of AND gate 708 or, in the absence of AND gate 708, to the set input S of flip-flop FF4. If the embodiment of FIG. 8 is employed, the circuitry shown therein replaces timer 702, counter 704, OR gate 706 and one shot 714. Normally, the clock 718 resets the timer 720 at very short intervals, preventing the latter from timing out. When switch Sw1 is depressed, clock 718 is disabled, allowing the timer 720 to run without being reset for as long as switch Sw1 is held down. If switch Sw1 is depressed for five seconds, timer 720 times out, applying a pulse F to AND gate 708 or in the absence of the AND gate directly to the set inputs of flip-flop FF4. In either case, flip-flop FF4 upon being set generates a disable signal D which is applied to the disable input of timer 506, initiating the untimed mode or the third (very long) timed mode, depending upon the absence or presence of timer 720.

Figure 9:
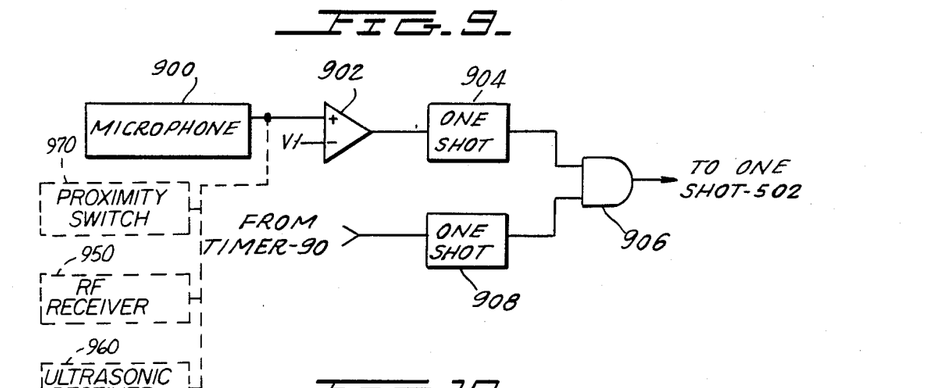
FIG. 9 is a block diagram illustrating one possible modification to the embodiment of FIG. 4.

In each of the foregoing embodiments, switch 12 is illustrated as a mechanical switch. Alternatively, a remote control switch, such as an audible switch, may be used. Such remote control switch may also be used in addition to the mechanical switch. One simple embodiment wherein an audible switch is used in addition to mechanical switch 12 is illustrated in FIGS. 1 and 9. As shown in FIG. 1, a microphone 900 is formed in face plate 14. As shown in FIG. 9, the microphone 900 is connected to a comparator 902 whose output goes high whenever the amplitude of the sound received by the microphone 900 rises above a predetermined level set by voltage V1. The output of comparator 902 is applied to one shot 904 which generates a single positive going pulse at its output whenever the output of comparator 902 switches from the low to the high level. The output of one shot 904 is applied to AND gate 906 whose remaining input is connected to the output of one shot 908. One shot 908 generates a single positive going pulse of relatively long duration (e.g. ten seconds) in response to the positive pulse appearing at the output of timer 90 (see FIG. 4) at the end of the 55 minute time interval. As such, the output of AND gate 906 will jump to the high level whenever microphone 900 receives an audible input of sufficient magnitude during the time interval defined by the output of one shot 908. The output of AND gate 906 is applied to the Sw1 input of one shot 502 thereby reinitiating a first timed interval of one hour whenever microphone 900 receives a sufficient audible signal during the time interval defined by one shot 908.

In accordance with the foregoing modification of the present invention, timer 90 will time out at the end of 55 minutes causing alarm control circuit 80 to enable alert circuit 40 (e.g. dimming light 38) to indicate that the light will soon be turned off. The output of timer 90 will also be applied to one shot 908 thereby defining a short time interval (e.g. ten seconds) during which an individual sitting in a room being illuminated by the light 38 can reinstitute a first timed mode of one hour by merely making a sound of sufficient volume to cause the output of comparator 902 to jump to the high level. If desired, a potentiometer can be provided for adjusting the magnitude of the voltage V1 and thereby adjusting the magnitude of the sound which must be generated to reinstitute the first timed mode.

Figure 10:
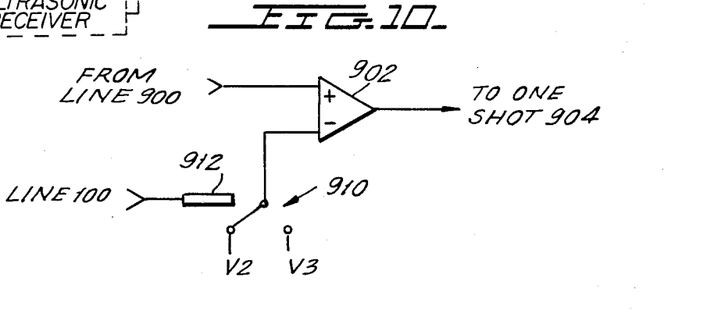
FIG. 10 is a block diagram illustrating a modification of the embodiment of FIG. 9.

If the magnitude of the voltage V1 is kept constant (for example, at a normal voice level), it is quite possible that the light 38 will be inadvertently turned on due to ambient noise. In order to reduce the possibility of accidentally turning the light 38 on, the circuit of FIG. 9 may be modified as illustrated in FIG. 10. As shown therein, the non-inverting input of comparator 902 is connected to voltages V2 and V3 via a switch 910. The voltage V2 is a relatively high voltage which corresponds to a sound level substantially above the normal voice level. The voltage V3 corresponds to the normal voice level. The position of the switch arm of switch 901 is determined by relay 912 which is connected to the line 100 of FIG. 3. Whenever the light 38 is off, line 100 will be an open circuit and relay 912 will be disabled. In this position, the switch arm of switch 910 is connected to voltage V2 with the result that a relatively loud noise, above the normal voice level, must be received by microphone 910 to enable one shot 904 and turn the light 38 on. Once the light 38 has been turned on, line 100 will receive the 120 volt line voltage which will enable relay 912 and cause the switch arm of switch 910 to switch to voltage V3. In this condition, one shot 904 will be enabled whenever microphone 900 receives a sound level corresponding to a normal voice level. If microphone 900 receives such a signal during the time window defined by timer 90, the first timed mode will be reinstituted. If desired, potentiometers may be used to adjust the magnitude of voltages V2, V3.

In each of the above embodiments, switch 12 is described as a manually actuable switch. It should be recognized, however, that a sound actuated, a proximity switch or any other known remote control switch could be used either instead of or in addition to the manually actuable switch. Examples of such alternative actuation means are shown in FIG. 9 as the proximity switch 970, the RF receiver 950 for detecting a radio frequency signal, of the ultrasound receiver 960 for detecting and responding to an ultrasound signal.

As stated above, unnecessary use of the untimed mode can be discouraged by requiring the use of a control key to initiate it. As will be readily clear to those skilled in the art, this variation can be practiced by providing a switch at point E (see FIGS. 4 and 6) such that the switch can only be closed by means of a control key inserted in key hole 32. Alternately, the additional switch could be used to allow connection of voltage V+ to point I (see FIG. 4) to actuate the timer 720 and set flip-flop FF4. In this manner, a user having the control key could initiate the very long timed mode at any time, while a user lacking such a key could do so only by actuating switch Sw1 in the special prescribed manner at the appropriate time.

Those skilled in the art will realize that the present invention could be implemented equally well using a microprocessor, and such an implementation is included within the scope of the invention.

The present invention may be embodied in other specific forms without departing from the spirit or essential attributes thereof and, accordingly, reference should be made to the appended claims, rather than to the forgoing specification, as indicating the scope of the invention.

What is claimed is:

1. An energy saving control circuit for controlling the operation of an electric light, said control circuit comprising:
    (A) a switch; and
    (B) control means responsive to the actuation of said switch for selectively operating said light in a first timed mode in which said light is turned on for a first predetermined time period and an untimed mode in which said light is turned on for an indefinite time period, said control means:
    (1) operating said light in said first timed mode when said switch is actuated in a first manner;
    (2) operating said light in said untimed mode when said switch is actuated in a second manner, different than said first manner; and
    (3) operating said light in said untimed mode only if said switch is first actuated in said first manner so as to initiate said first timed mode and said switch is thereafter actuated in said second manner during a predetermined time window defining a portion of said first predetermined time period.

2. The control circuit of claim 1, further including means for visually indicating that said control means is operating said light in said untimed mode.

3. The control circuit of claim 1, wherein said time window is located near the end of said first predetermined time period.

4. The control circuit of claim 3, wherein said control means generates an alert signal substantially at the beginning of said time window.

5. The control circuit of any one of claims 1, 3 or 4, wherein said first predetermined time period is approximately one hour and said time window is approximately five to ten minutes in duration.

6. The control circuit of claim 1, wherein said control means generates an alert signal a second predetermined time period before the end of said first predetermined time period to indicate that said light will be turned off at the end of said first time period if said switch is not reactuated.

7. The control circuit of any one of claims 4 or 6, wherein said alert signal is an audible alert signal.

8. The control circuit of any one of claims 4 or 6, wherein said alert signal is a visual alert signal.

9. The control circuit of claim 8, wherein said control means generates said alert signal by varying the intensity of said light.

10. The control circuit of claim 6, further including remote control means for causing said control means to reinitiate said first timed mode in response to a remote control signal generated during a time window following said alert signal.

11. The control circuit of claim 1, wherein said switch is a remote control switch.

12. The control circuit of claim 11, wherein said remote control switch is a sound activated switch.

13. The control circuit of claim 12, wherein said sound activated switch is activated by a first noise level before said light is turned on and is activated by a second noise level, lower than said first noise level, after said switch is turned on.

14. The control circuit of claim 1, wherein said second manner comprises the step of operating said switch in said first manner twice within a second predetermined time period.

15. The control circuit of claim 12, wherein said switch is a push-button switch, said first manner comprises the step of depressing said switch once and said second manner comprises the step of depressing said switch twice within said predetermined time window.

16. The control circuit of claim 1, wherein:

said switch is a push-button switch;
said first manner comprises the step of depressing said push-button switch for a period of time which is less than a second predetermined time period; and
said second manner comprises the step of depressing said push-button switch for a period of time which is greater than said second predetermined time period.

17. The control circuit of claim 1, wherein said switch is a first switch and wherein said control circuit further includes a key actuated switch, said control means operating said light in said untimed mode responsive to the actuation of said first switch in said second manner only if said key actuated switch has been actuated.

18. The control circuit of claim 1, further including a key actuated switch, said control means operating said light in said untimed mode responsive to the actuation of said key actuated switch.

19. The control circuit of claim 1, wherein said control means also operates said light in said untimed mode responsive to the receipt of a remote control signal.

20. The control circuit of claim 19, wherein said remote control signal is a radio signal.

21. The control circuit of claim 19, wherein said remote control signal is an audio signal.

22. The control circuit of claim 19, wherein said remote control signal is an ultrasonic signal.

23. The control circuit of claim 1, further including alert means for generating an alert signal after a second predetermined time period, longer than said first predetermined time period, after said control means has initiated said indefinite time period.

24. The control circuit of any one of claims 1, 3, 4, 6, 16 or 19, further including manually actuable master off switch means, said control means turning off said light responsive to the actuator of said master off switch means regardless of the mode of operation of said light at the time said master off switch is actuated.

25. The control circuit of any one of claim 1, wherein said control circuit further includes second manually operable switch means and wherein said control means operates said light in a second timed mode in which said light is turned on for a second predetermined time period which is shorter than said first predetermined time period responsive to the actuation of said second switch means.

26. The control circuit of claim 25, wherein said control means operates said light in said second timed mode responsive to the actuation of said second switch means irrespective of the mode of operation of said light when said second switch means is operated.

27. The control circuit of claim 25, wherein said first and second switch means comprise opposite ends of a rocker switch.

28. An energy saving light switch for controlling the operation of an electric light, said switch comprising:
(A) a human actuable switch;
(B) a control circuit for operating said light in a timed mode when said switch is turned on for a predetermined time period in response to the actuation of said switch, said control circuit:
(1) initiating said timed mode responsive to an initial actuation of said switch; and
(2) reinitiating said timed mode responsive to a subsequent actuation of said switch only if said subsequent actuation occurs during a predetermined time window forming a part of said predetermined time period.

29. An energy saving control circuit for controlling the operation of an electric light, said control circuit comprising:
(A) a switch; and
(B) control means responsive to the actuation of said switch means for selectively operating said light in a first timed mode in which said light is turned on for a first predetermined time period, a second timed mode in which said light is turned on for an second predetermined time period, substantially shorter than said first predetermined time period, and a third timed mode in which said light is turned on for a third predetermined time period which is substantially greater than said first predetermined time period, said control means:
(1) operating said light in said first timed mode when said switch is actuated in a first manner;
(2) operating said light in said second timed mode when said switch means is actuated in a second manner, different than said first manner;
(3) operating said light in said third timed mode when said switch means is actuated in a third manner different than said first and second manners; and
(4) operating said light in said third mode only if said switch means is first actuated in said first manner so as to initiate said first timed mode and said switch means is thereafter actuated in said second manner during a predetermined time window defining a portion of said first predetermined time period.

30. The control circuit of claim 29, further including manually actuable master off switch means, said control means turning off said light responsive to the actuation of said master off switch means regardless of the mode of operation of said light.

31. The control circuit of claim 29, wherein said time window is located near the end of said first predetermined time period.

32. The control circuit of claim 31, wherein said control means generates an alert signal at approximately the beginning of said time window.

33. The control circuit of any one of claims 29, 31, or 32, wherein said first predetermined time period is approximatly one hour and said time window is approximately five to ten minutes in duration.

34. The control circuit of claim 33, wherein said second predetermined time period is approximately ten minutes.

35. The control circuit of any one of claims 33, wherein said alert signal is an audible alert signal.

36. The control circuit of any one of claims 33, wherein said alert signal is a visual alert signal.

37. The control circuit of claim 36, wherein said control means generates an alert signal by varying the intensity of said light.

38. The control circuit of claim 29, wherein said control means generates an alert signal a fourth predetermined time period before the end of said first predetermined time period to indicate that said light will be turned off at the end of said first predetermined time period if said switch means is not reactivated.

39. The control circuit of claim 29, further including a key-actuated switch, said control means operating said light in said third timed mode responsive to the activation of said switch means in said second manner only if said key-actuated switch has been activated.

40. The control circuit of claim 29, wherein said control means also operates said light responsive to the receipt of a remote control signal.

41. The control circuit of claim 40, wherein said remote control signal is a radio signal.

42. The control circuit of claim 40, wherein said remote control signal is an audio signal.

43. The control circuit of claim 40, wherein said remote control signal is an ultrasonic signal.

44. The control circuit of claim 29, further including alert means for generating an alert signal after a fourth predetermined time period, longer than said first predetermined time period but shorter than said third predetermined time period, after said control means has initiated said third predetermined time period.

45. The control circuit of claim 29, further including means for visually indicating that said control means is operating said light in said third mode.

46. An energy saving control circuit for controlling the operation of an electric light, said control circuit comprising:
(A) a first switch;
(B) a second switch; and
(C) control means responsive to the actuation of said first and second switches for selectively operating said light in a first timed mode in which said light is turned on for a first predetermined time period, a second timed mode in which said light is turned on for a second predetermined time period, substantially shorter than said first predetermined time period, and a third timed mode in which said light is turned on for a third predetermined time period which is substantially greater than said first predetermined time period, said control means:
(1) operating said light in said first timed mode when said first switch is actuated in a first manner;
(2) operating said light in said second timed mode when said second switch is actuated; and
(3) operating said light in said third timed mode when said first switch is actuated in a second manner different that said first manner.

47. The control circuit of claim 46, wherein said second manner comprises the step of operating said first switch in said first manner twice during a fourth predetermined time period.

48. The control circuit of claim 47, wherein said first switch is a push-button switch, said first manner comprises the step of depressing said first switch once and said second manner comprises the step of depressing said first switch twice within said fourth predetermined time period.

49. The control circuit of claim 46, wherein said first switch is a push-button switch, said first manner comprises the step of depressing said push-button switch for a predetermined tube period which is less than a fourth predetermined time period and said second manner comprises the step of depressing said push-button switch for a period of time which is greater than said fourth predetermined period of time.

50. An energy saving light switch for controlling the operation of an electric light, said switch comprising:
(A) a human actuable switch;
(B) a control circuit responsive to the actuation of said human actuable switch for selectively operating said light in a first timed mode in which said light is turned on for a predetermined time period and a second untimed mode in which said light is turned on for an indefinite period of time, said control circuit:
(1) operating said light in said first timed mode responsive to an initial actuation of said human actuable switch; and
(2) operating said light in said second untimed mode responsive to an actuation of said human actuable switch during a predetermined time window forming part of said predetermined time period, said time window being located near the end of said predetermined time period.

51. The energy saving light switch on claim 50, wherein said human actuable switch is a push-button switch and wherein said control circuit operates said light in said first timed mode responsive to a single, initial actuation of said human actuable switch and wherein said control circuit operates said light in said second untimed mode responsive to a double actuation of said push-button switch during said predetermined time window.

52. The energy saving light switch of claim 50, wherein said human actuable switch is a push-button switch and wherein said control circuit operates said light in said first timed mode responsive to an initial depression of said push-button switch and operates said light in said second untimed mode responsive to the depression of said push-button switch for at least a minimum time period during said predetermined time window.

53. The energy saving light switch of claim 50, wherein said control circuit generates an alert sigal substantially at the beginning of said time window.

54. The energy saving light switch of any one of claims 50, or 53, wherein said predetermined time period is approximately one hour and said time window is approximately five to ten minutes in duration.

55. The energy saving light switch of claim 50, wherein said control circuit generates an alert signal a second predetermined time period for the end of said first predetermined time period to indicate that said light will be turned off at the end of said first time period if said switch is not reactuated.

56. The energy saving light switch of any one of claims 53 or 55, wherein said alert signal is an audible alert signal.

57. The energy saving light switch of any one of claims 53 or 55, wherein said alert signal is a visual alert signal.

58. The energy saving light switch of claim 57, wherein said control circuit generates said alert signal by varying the intensity of said light.

59. The energy saving light switch of claim 50, wherein said human actuable switch is a remote control switch.

60. The energy saving light switch of claim 59, wherein said remote control switch utilizes a radio control signal.

61. The energy saving light switch of claim 59, wherein said remote control switch utilizes an ultrasonic signal.

62. The energy saving light switch of claim 59, wherein said remote control switch utilizes an audible signal.

63. The energy saving light switch of claim 59, wherein said remote control switch is a proximity switch.

64. A method for controlling the operation of an electrical light, comprising the steps of:
(1) operating said light in a first timed mode in which said light is turned on for a predetermined time period responsive to an initial actuation of a human actuable switch; and
(2) operating said switch in a second untimed mode in which said light is turned on for an indefinite period of time responsive to the actuation of said human actuable switch during a predetermined time window forming part of said predetermined time period.

65. The method of claim 64, wherein said time window is located near the end of said predetermined time period.

66. The method of claim 65, wherein said predetermined time period is approximately one hour and said time window is approximately five to ten minutes in duration.

67. The method of claim 64, further including the step of generating an alert signal substantially at the beginning of said predetermined time window.

68. The method of claim 67, wherein said alert signal is an audible alert signal.

69. The method of claim 67, wherein said alert signal is a visual alert signal.

70. The method of claim 67, wherein said alert signal is generated by varying the intensity of said light.

71. The method of claim 64, wherein said human actuable switch is a remote control switch.

72. The method of claim 71, wherein said remote control switch utilizes a radio control signal.

73. The method of claim 71, wherein said remote control switch utilizes an ultrasonic signal.

74. The method of claim 71, wherein said remote control switch is a proximity switch.

75. The method of claim 64, wherein said human actuable switch is a push-button switch and wherein said light is operated in said first timed mode in response to a single, initial depression of said push-button switch and wherein said light is operated in said second untimed mode responsive to a double depression of said push-button switch during said predetermined time window.

76. The method of claim 64, wherein said human actuatable switch is a push-button switch and wherein said light is operated in said first timed mode responsive to an initial depression of said push-button switch and said light is operated in said untimed mode responsive to the depression of said push-button switch for at least a minimum time period during said predetermined time window.

77. A method for controlling the operation of an electric light, comprising the steps of:
(1) operating said light in a first timed mode wherein said light is turned on for a first predetermined time period responsive to the actuation of a human actuable switch in a first manner;
(2) operating said light in an untimed mode in which said light is turned on for an indefinite time period responsive to the actuation of said human actuable switch in a second manner, different than said first manner; operating said light in said untimed mode being effective only if said switch is first actuated in said first manner so as to initiate said first timed mode, said switch being thereafter actuated in said second manner during a predetermined time window defining a portion of said first predetermined time period.

78. The method of claim 77, wherein said time window is located near the end of said first predetermined time period.

79. The method of anyone of claims 77, or 78, wherein said first predetermined time period is approximately one hour and said time window is approximately five to ten minutes in duration.

80. The method of claim 78, wherein said control means generates an alert signal substantially at the beginning of said time window.

81. The method of claim 80, wherein said alert signal is an audible alert signal.

82. The method of claim 80, wherein said alert signal is a visual alert signal.

83. The method of claim 80, wherein said alert signal is generated by varying the intensity of said light.

84. A method for controlling the operation of an electric light, comprising the steps of:
(1) operating said light in a first timed mode wherein said light is turned on for a first predetermined time period when a human actuable switch is actuated in a first manner;
(2) operating said light in a second timed mode in which said light is turned on for a second predetermined time period, substantially longer than said first predetermined time period, when said switch is actuated in a second manner, different than said first manner;
(3) operating said light in an untimed mode in which said light is turned on for an indefinite time when said switch is actuated in a third manner, different than said first and second manners; operation of said light in said untimed mode being effective only if said switch is first actuated in said first or second manners so as to initiate said first or second timed modes, said switch being thereafter actuated in said third manner during a predetermined time window defining a portion of said first or second predetermined time periods.

85. The method of claim 84, wherein said time window is located near the end of said predetermined time period.

86. The method of claim 85, further including the step of generating an alert signal at approximately the beginning of said time window.

87. The method of claim 86, wherein said alert signal is an audible signal.

88. The method of claim 86, wherein said alert signal is a visual alert signal.

89. The method of claim 88, wherein said alert signal is generated by varying the intensity of said light.

90. The method of claim 84, wherein said light is operated in said second time mode responsive to the activation of said switch in said first or second manners only if a key actuated switch has first been activated.

* * * * *